United States Patent
Salonen

(10) Patent No.: US 9,937,531 B2
(45) Date of Patent: *Apr. 10, 2018

(54) METHOD AND SYSTEM FOR DELIVERY OF GOODS

(75) Inventor: Jukka Salonen, Luhtajoki (FI)

(73) Assignee: BookIT Oy Ajanvarauspalvelu, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/401,392

(22) Filed: Mar. 10, 2009

(65) Prior Publication Data

US 2010/0235251 A1 Sep. 16, 2010

(51) Int. Cl.
| G06Q 30/00 | (2012.01) |
| B07C 3/18 | (2006.01) |
| G06Q 10/08 | (2012.01) |
| G06Q 30/06 | (2012.01) |

(52) U.S. Cl.
CPC ............... *B07C 3/18* (2013.01); *G06Q 10/08* (2013.01); *G06Q 30/0601* (2013.01)

(58) Field of Classification Search
None
See application file for complete search history.

(56) References Cited

U.S. PATENT DOCUMENTS

| 5,592,666 A | 1/1997 | Perez |
| 5,838,965 A | 11/1998 | Kavanagh et al. |
| 5,940,818 A | 8/1999 | Malloy et al. |
| 5,987,467 A | 11/1999 | Ross et al. |
| 6,003,036 A | 12/1999 | Martin |
| 6,085,100 A | 7/2000 | Tarnanen |
| 6,104,870 A | 8/2000 | Frick et al. |
| 6,199,076 B1 | 3/2001 | Logan et al. |
| 6,539,360 B1 * | 3/2003 | Kadaba .......................... 705/28 |
| 6,560,456 B1 | 5/2003 | Lohtia et al. |
| 6,564,261 B1 | 5/2003 | Gudjonsson et al. |
| 6,625,461 B1 | 9/2003 | Bertacchi |

(Continued)

FOREIGN PATENT DOCUMENTS

| CN | 1675637 A | 9/2005 |
| EP | 0 881 802 A1 | 2/1998 |

(Continued)

OTHER PUBLICATIONS

Bmd wireless AG, Wireless Application messaging server, 2004.

(Continued)

*Primary Examiner* — Fateh M Obaid
(74) *Attorney, Agent, or Firm* — Barnes & Thornburg LLP

(57) ABSTRACT

The present publication discloses a method and system for delivering goods from main system ($S_1$) via subsystem ($S_2$) to an end address ($D_1$-$D_n$) of the customer (3). According to the invention the end address ($D_1$-$D_n$) of the customer (3) is enquired (4) from the customer via telecommunications network by a multiple choice enquiry (4), the end address ($D_1$-$D_n$) selected by the customer is received (5) and the goods are delivered to the selected end address ($D_1$-$D_n$).

12 Claims, 1 Drawing Sheet

(56) References Cited

U.S. PATENT DOCUMENTS

| | | | |
|---|---|---|---|
| 6,639,919 B2 | 10/2003 | Kroninger et al. | |
| 6,772,336 B1 | 8/2004 | Dixon, Jr. | |
| 6,990,332 B2 | 1/2006 | Vihinen | |
| 7,149,537 B1 | 12/2006 | Kupsh et al. | |
| 7,154,060 B2* | 12/2006 | Rosenbaum et al. | 209/584 |
| 7,222,081 B1* | 5/2007 | Sone | 705/7 |
| 7,406,429 B2 | 7/2008 | Salonen | |
| 7,451,118 B2 | 11/2008 | McMeen et al. | |
| 7,610,208 B2 | 10/2009 | Salonen | |
| 7,610,224 B2* | 10/2009 | Spiegel | 705/28 |
| 7,619,584 B2* | 11/2009 | Wolf | 345/1.2 |
| 7,660,397 B2 | 2/2010 | Heen et al. | |
| 8,050,664 B2 | 11/2011 | Salonen | |
| 2001/0037264 A1 | 11/2001 | Husemann et al. | |
| 2001/0049785 A1 | 12/2001 | Kawan et al. | |
| 2002/0028686 A1 | 3/2002 | Kagi | |
| 2002/0032589 A1 | 3/2002 | Shah | |
| 2002/0059146 A1 | 5/2002 | Keech | |
| 2002/0080822 A1 | 6/2002 | Brown et al. | |
| 2002/0104007 A1 | 8/2002 | Moodie et al. | |
| 2002/0111914 A1* | 8/2002 | Terada et al. | 705/60 |
| 2002/0165000 A1 | 11/2002 | Fok | |
| 2002/0173319 A1 | 11/2002 | Fostick | |
| 2002/0180696 A1 | 12/2002 | Maritzen et al. | |
| 2002/0184509 A1 | 12/2002 | Scheidt et al. | |
| 2002/0188562 A1 | 12/2002 | Igarashi et al. | |
| 2002/0191795 A1 | 12/2002 | Wills | |
| 2003/0005126 A1 | 1/2003 | Schwartz et al. | |
| 2003/0101071 A1 | 5/2003 | Salonen | |
| 2003/0163536 A1 | 8/2003 | Pettine, Jr. | |
| 2003/0211844 A1* | 11/2003 | Omori | 455/414.2 |
| 2004/0128158 A1 | 7/2004 | Salonen | |
| 2004/0128173 A1 | 7/2004 | Salonen | |
| 2004/0139318 A1 | 7/2004 | Chen et al. | |
| 2004/0157628 A1 | 8/2004 | Daniel et al. | |
| 2004/0185883 A1 | 9/2004 | Rukman | |
| 2004/0198322 A1 | 10/2004 | Mercer | |
| 2005/0027608 A1 | 2/2005 | Wiesmuller et al. | |
| 2005/0054286 A1 | 3/2005 | Kanjilal et al. | |
| 2005/0065995 A1 | 3/2005 | Milstein et al. | |
| 2005/0102230 A1 | 6/2005 | Haidar | |
| 2005/0171738 A1* | 8/2005 | Kadaba | 702/187 |
| 2005/0246209 A1 | 11/2005 | Salonen | |
| 2005/0268107 A1 | 12/2005 | Harris et al. | |
| 2006/0010085 A1 | 1/2006 | McMeen et al. | |
| 2006/0040682 A1 | 2/2006 | Goertz et al. | |
| 2006/0075139 A1 | 4/2006 | Jungek | |
| 2006/0131385 A1 | 6/2006 | Kim | |
| 2006/0224407 A1 | 10/2006 | Mills | |
| 2006/0271551 A1 | 11/2006 | Suojasto | |
| 2007/0010266 A1 | 1/2007 | Chaudhuri | |
| 2007/0047533 A1 | 3/2007 | Criddle et al. | |
| 2007/0135101 A1 | 6/2007 | Ramati et al. | |
| 2007/0143230 A1 | 6/2007 | Narainsamy et al. | |
| 2008/0147408 A1 | 6/2008 | Da Palma et al. | |
| 2008/0317224 A1 | 12/2008 | Salonen | |
| 2009/0281929 A1* | 11/2009 | Boitet et al. | 705/28 |

FOREIGN PATENT DOCUMENTS

| | | |
|---|---|---|
| EP | 0 967 754 A2 | 12/1999 |
| EP | 1 065 899 A1 | 1/2001 |
| EP | 1 458 201 A1 | 9/2004 |
| EP | 1 546 938 B1 | 9/2010 |
| FI | 20011680 | 2/2003 |
| FI | 117663 A1 | 12/2006 |
| FI | 20060387 | 10/2007 |
| FI | 118586 B | 12/2007 |
| GB | 2391646 A | 11/2004 |
| GB | 2435565 A | 8/2007 |
| KR | 20040013261 A | 2/2004 |
| WO | 2002067602 A1 | 8/2002 |
| WO | 2004019223 A1 | 3/2004 |
| WO | 2006122399 A1 | 11/2006 |
| WO | 2007122292 A1 | 1/2007 |
| WO | 2007063179 A1 | 6/2007 |
| WO | 2007125171 AQ | 11/2007 |
| WO | 2008017695 A1 | 7/2008 |
| WO | 2010000949 A1 | 1/2010 |

OTHER PUBLICATIONS

Content Gateway, Version 4.0 Development and Billing Manual, Version 1.0, 1.1.2005, TeliaSonera Finland OY, www.sonera.fifiles-sonera.fi.

Elisa Plc's Press Release Nov. 22, 2004, "Innovative Solution receives 2004 European Good Practice Award in Oppupaational Health and Safety" and the appendix: BookIT case. pdf".

Elisa Plc's Press Release Sep. 6, 2004, "Bookit Ltd and Elisa Implement a Handy Mobile Phone-enabled Check-in Service for Finnair" www.elisa.fi.

Enpower Interactive Group Ltd, Virtual Mobile Redirector—Product Information Document, 2001.

Finnair Plc's press release Sep. 6, 2004, "Finnair to Introduce The World's Easiest Check-in—with a text message", www.bookit.netnews.

Finnish Search Report Apr. 5, 2006.

Finnish Search Report Mar. 6, 2009.

Jyrki Penttinen, GSM-tekniikka, WSOY, Porvoo 1999, p. 155-157, 222 & 331-332.

Kauppalehti, Mobiilipalvelujen oltava yksinkertaisia: BookIT: n Jukka Salonen uskoo tavallisiin tekstiviesteihin, Heikki Nenonen, p. 19, published Sep. 9, 2005.

Mobileway, "Mobileway launches is Mobile Transaction Tracker solution—an interactive platform to authenticate macropayment made by mobile consumer," http://www.mobileway.com/pages/newsevents/pressrelease, Mobileway, 2002, pp. 1-2.

Mouly et al, The GSM System for Mobile Communications, Palaiseau 1992, pp. 556-560.

Verkkouutiset Feb. 21, 2001, "Seonera tarjoaa matkaviestinoperaattoreille Content Gateway-palvelualustaa", www.verkkouutiset.fi.

* cited by examiner

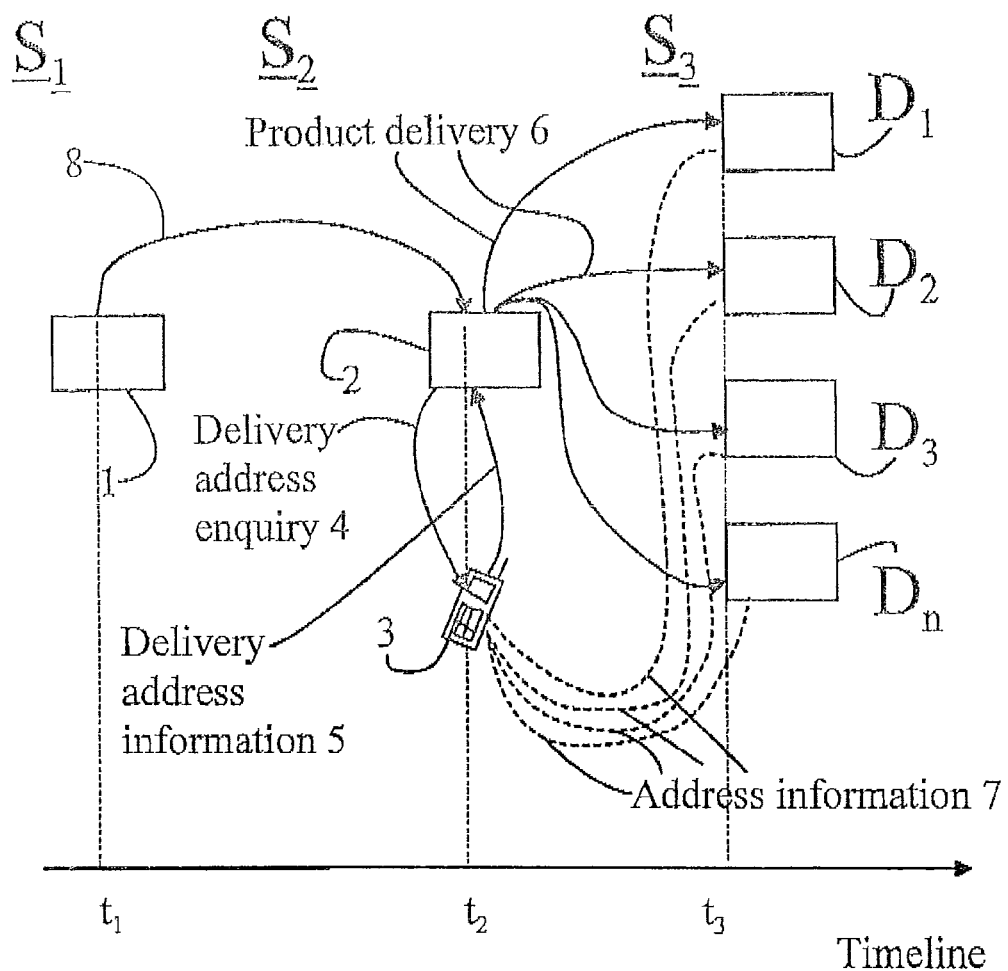

METHOD AND SYSTEM FOR DELIVERY OF GOODS

The present invention relates to a method, according to the preamble of Claim 1, for delivering of goods.

The invention also relates to a system, according to Claim 8.

Methods and systems of this kind are used, for example, for delivering of goods for customers.

According to the prior art, delivery of goods is based on a predetermined sending address, which is static for each person.

However, in the modern life people have several actual addresses like home address, working address, summer home address etc. The present systems send goods to one of the static addresses and at most checks if the person is in this address. For example a package sent from Finland to UK to a predetermined mailing address (also end address in this document) will be first received by a Finnish post office. From this office it will be delivered to the international department and further collected to group of packages heading to UK. In the UK the package will first reach a sorting office and will be sent in accordance with the mailing address to the corresponding branch post office. The branch post office delivers the package to the mailing address determined in the package. By this present method occur several false delivery attempts. This causes trouble both for the delivery company and for the customer in form of additional costs and unnecessary delivery attempts have also a negative ecological effect in form of increased carbon emissions.

The invention is intended to eliminate the problems of the prior art disclosed above and for this purpose create an entirely new type of method and system for delivery of goods.

The invention is based on using the mobile terminal of the client as a virtual address and using an enquiry to this terminal for determining the real destination address for the goods.

More specifically, the method according to the invention is characterized by what is stated in the characterizing portion of Claim 1.

The system according to the invention is, in turn, characterized by what is stated in the characterizing portion of Claim 8.

Considerable advantages are gained with the aid of the invention.

The solution facilitates a dynamic address for the customer which is constantly updated. By this feature essential cost savings are gained in the delivery organization side. As a consequence also the customer prises can be reduced.

The delivery firm obtains always an updated actual delivery address without changing the general delivery system. This an essential advantage because delivery systems like mailing systems and courier services are based on highly standardized solutions where there is no room for major system changes.

In the following, the invention is examined with the aid of examples and with reference to the accompanying drawing.

FIG. 1 shows schematically a solution according to the invention.

The following terms are used in combination with the reference numerals:
1 sorting office
2 branch post office
3 client, clients mobile terminal
4 delivery address enquiry
5 delivery address information
6 end delivery of the product
7 address information
8 intermediate delivery of the product
$S_1$ main delivery system
$S_2$ delivery subsystem
$S_3$ delivery system end level
$D_1$-$D_n$ end delivery addresses
$t_1$ product delivery start time
$t_2$ intermediate product delivery time
$t_3$ product end delivery time According to FIG. 1, in the prior art delivery systems the goods would have been delivered front the system $S_1$ through system $S_2$ to one of the destination addresses $D_1$-$D_n$ in the end address system $S_3$ in accordance with one address information defined before the delivery process.

In a preferred embodiment of the present invention, the sorting office 1 sends information to the branch post office 2 of a package that will be sent to a customer. This information will be sent in accordance with the invention e.g., electronically via telecommunication network. For this purpose may be used the internal telecommunication network of the delivery organization, external telephone network, internet etc. The telecommunications protocol may be e-mail, SMS, packet-switched data etc.

The branch office 2 will send an enquiry 4 to the customer for which one of the possible delivery addresses the customer wants to receive the package. This information will be sent in accordance with the invention e.g., electronically via telecommunication network. For this purpose may be used telephone network, internet network etc. or another telecommunications network with adequate geographical and custom coverage. The telecommunications protocol may be e-mail, SMS, packet-switched data etc.

The customer replies to the enquiry, whereafter the actual package is sent from the sorting office 1 to the branch post office 2 and from there to the customer.

As an alternative embodiment of the invention, if it turns out from the answer 5 to the enquiry 4 that the client 3 is close to his own branch post office 1 the delivery can be sent to another branch post office. Further, if it turns out from the answer 5 to the enquiry 4 that the client is on holidays, the delivery may be delayed. This procedure might need a multiple step inquiry/reply process, and in this case in accordance with the invention so called dynamic Dialogue Matrix (DDM, will be described later) may be used for managing the multistep dialogue.

In accordance with one embodiment of the invention the sorting office 1 starts delivering the goods at time $t_1$ by all intermediate good delivery 8 to a branch post office 2 based on the general delivery address data like town or area. When the delivered goods arrive to the branch office 2 the system makes an end address enquiry 4 to the client's terminal 3 via telecommunications network. The enquiry 4 can be made e.g. as a text message (e.g. SMS) where the client is allowed to select from multiple destination addressed $D_1$-$D_n$. The address information 7 relating to each customer is stored in the system. The enquiry 4 may be e.g. such a text message where the suitable end address $D_1$-$D_n$ can be selected as a single character (1, 2, 3, A, B, C . . . ) from the terminal's 3 keyboard. In other words the enquiry may be a multiple choice enquiry. These addresses $D_1$-$D_n$ are stored in the delivery systems database and can be dynamically updated during enquiries for example allowing for the client one additional selection "none of the listed addresses" and enquiring the content of the new address in a new message which will be updated into the system's database. After reception of the delivery address information 5 the goods will be delivered to selected correct end address of the multiple end addresses $D_1$-$D_n$. The delivery of the goods happens at time $t_3$.

The intelligence of the system is typically positioned in the main system $S_1$ or subsystem. $S_2$.

Alternatively, in accordance with the invention the delivery address enquiry 4 can be made also from the main delivery system $S_1$ and in this case the only address the system needs is the identity of the mobile terminal 3. In this case $S_1$ sends the end address information via telecommunications network also to $S_2$ whereby the information delay of the prior art between $t_1$ and $t_2$ may be avoided almost completely.

The terminal 3 is typically a mobile phone but may be also be a palmtop or laptop computer or their equivalent.

The telecommunications protocol is typically SMS, but the invention can be used also with other protocols like e-mail, push-email etc.

The location of the mobile terminal can be also used as a preliminary information of the client to deliver the goods to a correct delivery subsystem $S_2$ or even to a correct end address $D_1$-$D_n$.

The method and system according to the invention are implemented, with the aid of at least one computer, in a telecommunications network.

For processing and managing enquiries 4 and corresponding replies 5 can be used so called dynamic dialogue matrix DDM invented and developed by the applicant of this document. For example in document EP1939770 is described a solutions where client such replies are managed, when a client has been given a number of questions and the client is using SMS text messages or similar technology in which a reply does not automatically include an explicit reference to the inquiry. The publication presents a solution using dynamic dialog matrices. An inquiry always includes some kind of receiver's address or identification. In the SMS text message case that is so called B subscriber's number. On the other hand, sender's A subscriber's number or Calling Line Identity (CLI), or similar identification is also attached to each text message. If a mediator service that sends inquiries to a client, uses different A subscriber numbers in different inquires, it is possible to differentiate between answers based on which number the client is sending replies to. Using a dialog matrix, a mediator keeps track on inquires and answers. In the matrix, there is column for each client and a row for each A subscriber number the mediator is using. After sending all inquiry from a certain A subscriber number to a client, the status and the reply is stored in the corresponding shell of the matrix. As a result, the mediator is able to find out whether the client has replied to a certain inquiry and what the answer was.

The invention claimed is:

1. A delivery service operation method comprising:
   storing, in a computer, for each of a plurality of delivery service customers:
   at least one communication address for communicating with a respective mobile terminal of the customer over a telecommunication network; and
   a set of two or more different delivery addresses, each delivery address indicating a delivery location;
   for each of a plurality of delivery items to be delivered by the delivery service, wherein each delivery item is associated with a respective recipient who is one of the plurality of delivery service customers:
   transferring the delivery item from a sorting office to a branch office associated with the recipient;
   using the computer to send an inquiry to the mobile terminal of the recipient over the telecommunication network, the inquiry being a text message, wherein the inquiry text message comprises a listing of two or more of the stored different delivery addresses for the recipient that receives the inquiry message;
   receiving, from the recipient's mobile terminal, a text message reply which comprises a selection of one of the listed delivery addresses selected by the recipient on their mobile terminal; and
   delivering the delivery item by the delivery service to the delivery location indicated by the delivery address corresponding to the selection included in the reply text message,
   wherein each text inquiry message and corresponding text reply message share an identification, whereby, for each text reply message received, the corresponding text inquiry message can be identified.

2. The method of claim 1, further comprising using multiple text inquiry-reply pairs to determine at least one of the delivery addresses for the delivery item and the branch office associated with the recipient.

3. The method of claim 1, further comprising using a determined location of the recipient's mobile terminal to determine which of multiple branch offices the delivery item is to be delivered to from the sorting office.

4. The method of claim 1, wherein each listed delivery addresses is listed with a corresponding selection symbol that is one character in length.

5. A data processing system comprising:
   a computer which stores a database which includes, for each of a plurality of delivery service customers:
   at least one communication address for communicating with a respective mobile terminal of the customer over a telecommunication network;
   a set of two or more different delivery addresses, each delivery address indicating a delivery location;
   wherein the data processing system controls operation of a delivery service, wherein the operation comprises:
   for each of a plurality of delivery items, each of which being associated with a respective recipient who is one of the plurality of delivery service customers:
   the data processing system sending instructions, which cause transferal of the delivery item from a sorting office to a branch office associated with the recipient;
   the data processing system sending a text message inquiry to the mobile terminal of the recipient over the telecommunication network, wherein the text message inquiry comprises a listing of two or more of the stored different delivery addresses for the recipient that receives the inquiry text message, wherein the listed two or more of the stored different delivery addresses are provided in the inquiry text message;
   the data processing system receiving, from the recipient's mobile terminal of the recipient, a reply text message which comprises a selection of one of the listed delivery addresses selected by the recipient on their mobile terminal, the reply text message being received over the telecommunication network; and
   the data processing system sending instructions which cause delivery of the delivery item by the delivery service to the delivery location indicated by the delivery address corresponding to the selection included in the reply text message, wherein each inquiry text message and corresponding reply text message share an identification, whereby, for each reply text message received, the corresponding inquiry text can be identified.

6. The data processing system of claim 5, wherein the data processing system uses multiple inquiry-reply text message pairs to determine at least one of the delivery addresses for the delivery item and the branch office associated with the recipient.

7. The data processing system of claim 5, wherein the data processing system uses a determined location of the recipient's mobile terminal to determine which of multiple branch offices the delivery item is to be delivered to from the sorting office.

8. The data processing system of claim 5, wherein each listed delivery addresses is listed with a corresponding selection symbol that is one character in length.

9. The method of claim 1, wherein the text messages are sent using a telecommunication protocol that is Short Message Service Protocol.

10. The system of claim 5, wherein the text messages are sent using a telecommunication protocol that is Short Message Service Protocol.

11. The method of claim 1, wherein the inquiry and the reply text messages are Short Message Service messages.

12. The system of claim 5, wherein the inquiry and the reply text messages are Short Message Service messages.

* * * * *